United States Patent [19]

Horichi

[11] 3,828,241

[45] Aug. 6, 1974

[54] REGULATED VOLTAGE SUPPLY CIRCUIT WHICH COMPENSATES FOR TEMPERATURE AND INPUT VOLTAGE VARIATIONS

[75] Inventor: Tetsuya Horichi, Tokyo, Japan

[73] Assignee: Sony Corporation, Tokyo, Japan

[22] Filed: Oct. 10, 1973

[21] Appl. No.: 405,039

Related U.S. Application Data

[63] Continuation-in-part of Ser. No. 383,569, July 30, 1971, abandoned.

[30] Foreign Application Priority Data

Aug. 7, 1972 Japan............................47-78888

[52] U.S. Cl................. 323/22 T, 307/297, 307/310, 307/313, 323/8

[51] Int. Cl............................................. G05f 5/00

[58] Field of Search........ 307/297, 310, 313; 323/4, 323/9, 8, 22 T

[56] References Cited

UNITED STATES PATENTS

| | | | |
|---|---|---|---|
| 3,522,521 | 8/1970 | Lloyd | 323/22 T |
| 3,549,910 | 12/1970 | Ogawa et al. | 307/313 X |
| 3,612,984 | 10/1971 | Temple et al. | 323/22 T X |
| 3,617,859 | 11/1971 | Dobkin et al. | 323/4 |

OTHER PUBLICATIONS

IBM Technical Disclosure Bulletin, Vol. 14, No. 5, Oct. 1971; pg. 1495, "Current Source" by Platt et al.

*Primary Examiner*—Gerald Goldberg
*Attorney, Agent, or Firm*—Lewis H. Eslinger, Esq; Alvin Sinderbrand, Esq.

[57] ABSTRACT

A regulated voltage supply circuit including first, second and third transistors of one conductivity type and a fourth transistor of the opposite conductivity type connected in a specific configuration. The emitter-collector path of the second transistor and the emitter-collector path of the third transistor are connected in series between the first and second voltage terminals of a voltage supply source. The emitter-collector path of the first transistor is connected between the first and second voltage terminals in parallel with the series connected emitter-collector paths of the second and third transistors. The base and collector electrodes of the first transistor are connected to the emitter and base electrodes of the second transistor respectively and the first and second transistors form a first degenerative feedback circuit for the regulation of the supply voltage. The base electrodes of the third and fourth transistors are connected to each other and the collector and emitter electrodes of the fourth transistor are connected to the emitter electrode of the second transistor and the second voltage terminal respectively. The third and fourth transistors form a second degenerative feedback circuit for the regulation of the supply voltage and a desirably regulated or stabilized DC voltage is obtained from the collector of the second transistor.

8 Claims, 8 Drawing Figures

REGULATED VOLTAGE SUPPLY CIRCUIT WHICH COMPENSATES FOR TEMPERATURE AND INPUT VOLTAGE VARIATIONS

This is a continuation-in-part of copending application Ser. No. 383,569 filed July 30, 1973, now abandoned.

BACKGROUND OF THE INVENTION

1. Field of the Invention

This invention relates generally to a regulated voltage supply circuit and more particularly to such a circuit utilizing three transistors of one conductivity type and another transistor of the opposite conductivity type and suitable for fabrication as an integrated circuit.

2. Description of the Prior Art

Several kinds of regulated voltage supply circuits for semi-conductor amplifiers are known in the prior art. Such circuits are designed to have a specific temperature characteristic relative to the temperature characteristic of the semiconductor amplifiers connected thereto in order to compensate for or cancel the temperature characteristic of the amplifiers, and are also designed to obtain an output DC voltage which is regulated regardless of variations in an operating voltage supplied to the circuits.

However, in the conventional circuits, a sufficiently regulated output voltage is usually not obtained and the DC potentials in the semiconductor amplifier supplied with the output voltage from such conventional circuits are apt to change in response to variations in the supplied voltages.

Such insufficiency in the regulation of the output voltage of the prior art circuits results from their circuit arrangements.

OBJECTS OF THE INVENTION

Accordingly, it is an object of this invention to provide a novel regulated voltage supply circuit avoiding the above mentioned disadvantage inherent in the prior art.

Another object of this invention is to provide a novel circuit arrangement of a regulated voltage supply circuit in which the output DC voltage is greatly regulated regardless of variations in an operating voltage supplied to the circuit.

A further object of this invention is to provide a novel regulated voltage supply circuit which has a specific temperature characteristic that may correspond to, and compensate for the temperature characteristic of a semiconductor amplifier connected therewith.

A still further object of this invention is to provide a novel regulated voltage supply circuit suitable for fabrication as an integrated circuit.

SUMMARY OF THE INVENTION

The present invention provides an improved regulated voltage supply circuit, especially for a transistor amplifier, which produces a greatly regulated DC voltage. The DC voltage derived from the circuit has a specific temperature characteristic to compensate for or cancel that of the transistor amplifier to which the DC voltage is supplied.

The circuit according to the present invention includes first, second and third transistors of one conductivity type and a fourth transistor of the opposite conductivity type. The emitter electrode of the first transistor is connected to a first voltage terminal of a voltage source and the collector electrode of the same is connected to a second voltage terminal of the voltage source through a first resistor.

The emitter electrode of the second transistor is connected to the first voltage terminal through a second resistor and is also connected to the base electrode of the first transistor. Thus, the first and second transistors operate as a constant current supply circuit for the remaining parts of the circuit and further form a first degenerative feedback circuit for the regulation of the output voltage of the circuit. The emitter electrode of the third transistor is connected to the collector electrode of the second transistor and the collector electrode of the third transistor is connected to the second voltage terminal. The base electrodes of the third and fourth transistors are connected to each other, and the collector and emitter electrodes of the fourth transistor are connected to the emitter electrode of the second transistor and the second voltage terminal respectively.

Thus, the emitter-collector path of the second transistor, the emitter-base path of the third transistor and the base-collector path of the fourth transistor together form a second degenerative feedback loop for the regulation of the output voltage and a greatly regulated or stabilized DC output voltage is obtained from the collector of the second transistor.

The output DC voltage of the above arrangement becomes $2V_{BE}$ and may be approximately on the order of 1.4 volts, and the output voltage has a temperature characteristic corresponding to that of a pair of series connected PN junctions.

When the output voltage is to be increased or it is desired that the temperature characteristic be different from that described above, a number of forward biased PN junctions are provided either between the base electrodes of the third and fourth transistors, between the collector electrode of the second transistor or the output terminal and the emitter electrode of the third transistor or between the emitter electrode of the fourth transistor and the second voltage terminal.

DESCRIPTION OF THE PREFERRED EMBODIMENTS

Figure 1:
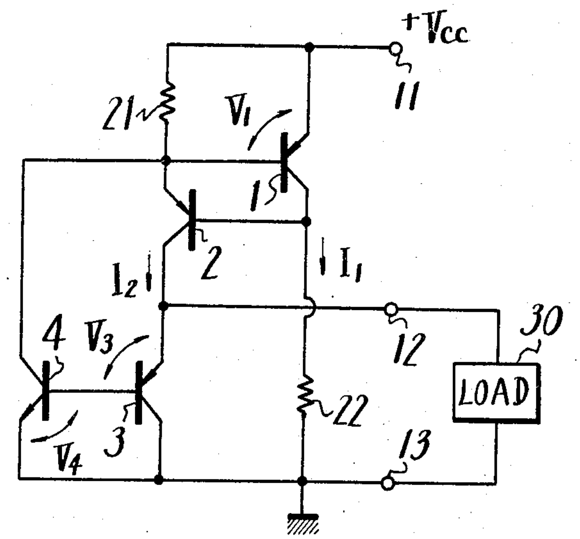
FIG. 1 is a circuit diagram showing an example of the invention.

Regulated or constant voltage supply circuits according to this invention will be hereinafter described with reference to the drawings throughout which the same reference numerals and characters are used to designate like elements. Referring initially to FIG. 1, it will be seen that the regulated or constant voltage supply circuit there shown includes transistors 1, 2 and 3 of the same conductivity type and a transistor 4 of the opposite conductivity type.

In the embodiment of FIG. 1, the emitter electrode of the transistor 1 is connected to an electric power source terminal 11 of +Vcc, while its collector and base electrodes are connected to the base and emitter electrodes of the transistor 2, respectively. The base electrode of the transistor 1 is further connected through a resistor 21 to the power source terminal 11 and the collector electrode thereof is connected through a resistor 22 to a reference voltage terminal 13 such, for example, as the ground. The collector electrode of the transistor 2 is connected to an output terminal 12 and also to the emitter electrode of the transistor 3. The collector electrode of transistor 3 is connected to the reference voltage terminal 13 and its base electrode is connected to the base electrode of the transistor 4. The emitter electrode of the transistor 4 is connected to the reference voltage terminal 13 and the collector electrode thereof is connected to the base electrode of the transistor 1. A suitable load circuit 30 is connected between the output terminal 12 and the reference voltage terminal 13.

The regulated or constant voltage supply circuit shown in FIG. 1 can be formed on a single semiconductor wafer as a monolithic integrated circuit and when the output voltage therefrom is supplied to external circuits, the terminals 11 to 13 serve as external connection terminals, or the regulated or constant voltage supply circuit can be formed as an integrated circuit on the same semiconductor wafer as a circuit to which the output from the regulated or constant voltage supply circuit is to be applied.

In the operation of the circuit shown in FIG. 1, the transistors 1 and 2 together operate as a constant current supply circuit for the remaining parts of the circuit. Since a negative feedback path is formed from the collector electrode to the base electrode of the transistor 1 through the base-emitter path of the transistor 2, the collector currents, namely, the output currents $I_1$ and $I_2$ are regulated with respect to the supply voltage Vcc and the temperature and variations of the currents $I_1$ and $I_2$ are suppressed to a certain degree when the supply voltage Vcc or the temperature changes.

Such a circuit arrangement is often used in a regulated voltage supply circuit of the prior art.

However, the regulating operation of the transistors 1 and 2 is actually insufficient and the currents $I_1$ and $I_2$ do, in fact, change in accordance with the change of the supply voltage Vcc or the temperature in the same direction. When the power supply voltage *Vcc* or the temperature changes, for example, increases and the collector current $I_1$ of the transistor 1 increases, the voltage $V_1$ across the base-emitter of the transistor is increased to thereby increase the current $V_1R_{21}$ (where $R_{21}$ represents the resistance value of the resistor 21) flowing through the resistor 21. As a result, the collector currents of the transistors 2 and 3 tend to increase and hence their base currents also tend to increase.

However, in the circuit of FIG. 1, the path from the collector electrode of the transistor 2 through the emitter-base path of the transistor 3 and the base-collector path of the transistor 4 to the emitter electrode of the transistor 2 forms the negative current feedback loop, so that, when the base current of the transistor 3 increases, the base current of the transistor 4 also increases to increase the current which flows into the collector electrode of the transistor 4 from the resistor 21. The increase of the collector current $I_2$ of the transistor 2 caused by the increase of the power supply voltage Vcc or the temperature is cancelled by the increased current which flows into the collector electrode of transistor 4 from resistor 21, and hence the collector current $I_2$ is kept substantially constant irrespective of the power supply voltage Vcc or the temperature.

If the collector current $I_2$ is thus kept substantially constant, the voltage $V_3$ and $V_4$ across the base-emitter of the transistor 3 and across that of the transistor 4 are constant at a fixed temperature and consequently a constant output voltage $(V_3+V_4)$ is obtained at the terminal 12 irrespective of the power supply voltage Vcc.

The output voltage of $(V_3+V_4)$ has a temperature characteristic corresponding to that of two PN junctions, so that in the case where the load circuit 30 is, for example, a so-called Darlington amplifier consisting of two transistors, and if the output voltage of $V_3+V_4$ is used as a bias voltage for the base-emitter thereof, the amplifier can be made stable for temperature change. Further, the DC potential in the load circuit 30 is kept constant relative to the variations of the supply voltage *Vcc* because the current $I_2$ is made to be constant.

With the regulated or constant voltage supply circuit according to this invention, at the terminal 12 there is obtained a voltage which does not vary with variations of the power supply voltage Vcc and which has a temperature characteristic similar to that of one or more PN junctions. Further, the entire circuit can be formed as a monolithic integrated circuit.

Figure 7:
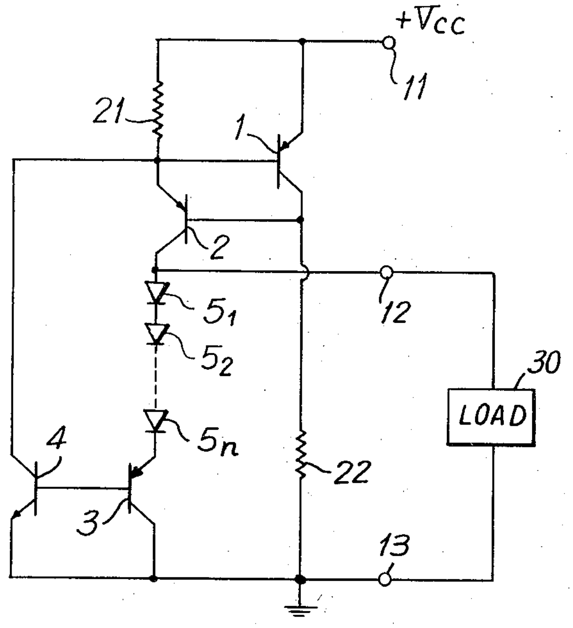
Figure 8:
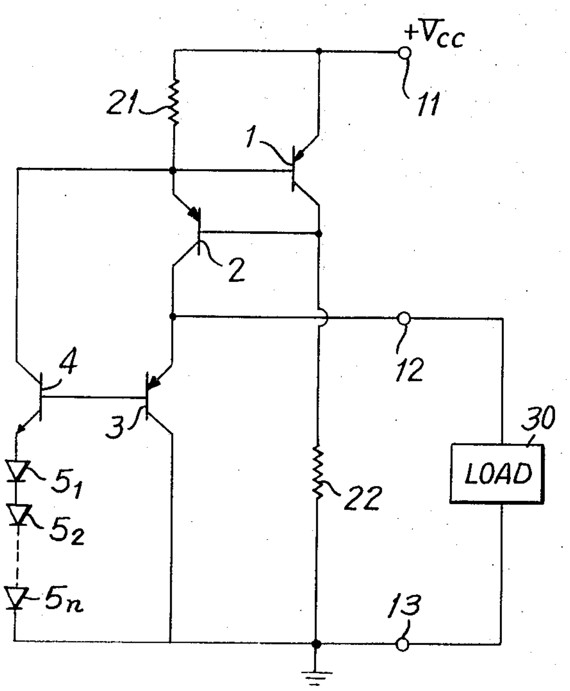

In the circuit shown in FIG. 1, the output voltage is $V_3+V_4$ and may be on the order of 1.4 volts. In the circuit shown in FIG. 2, however, a number of diodes $5_1, 5_2, \ldots 5_n$ are connected in series between the base electrodes of the transistors 4 and 3 as PN junction elements to make the output voltage as $V_3+V_4+nV_d$ (where $V_d$ represents a voltage across each of the diodes $5_1, 5_2 \ldots 5_n$). Thus, with the circuit shown in FIG. 2, its output voltage has temperature characteristic corresponding to that of $(n+2)$ PN junctions. It will be apparent that the same effect can be obtained by connecting the same number of diodes $5_1, 5_2, \ldots 5_n$ between the terminal 12 and the emitter electrode of the transistor 3, as shown on FIG. 7, or between the emitter electrode of the transistor 4 and the terminal 13, as shown on FIG. 8.

Figure 2:
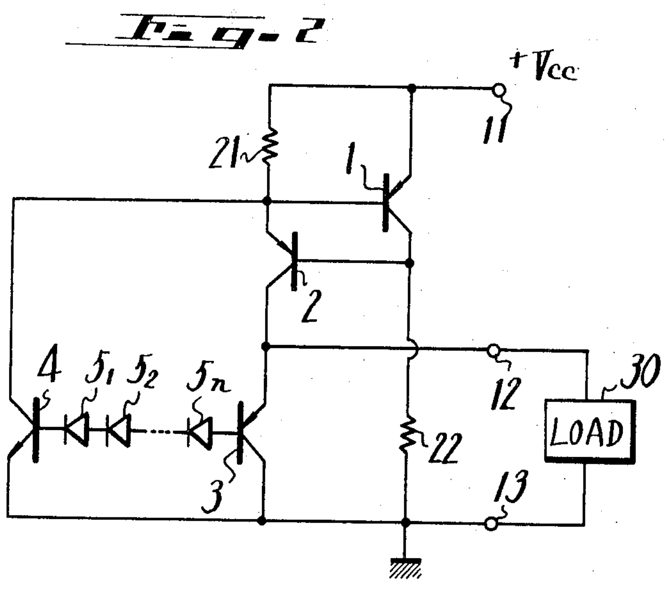
FIGS. 2 to 8, inclusive, are circuit diagrams showing other embodiments of the invention.
Figure 3:
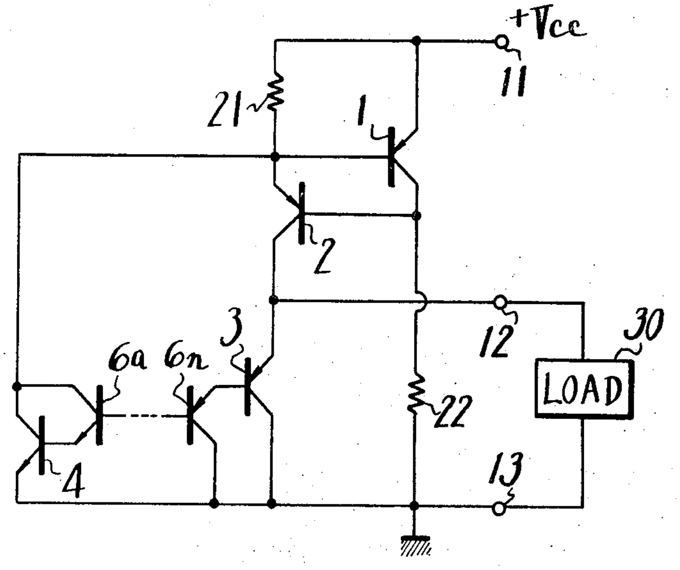

As shown in FIG. 3, in place of the diodes $5_1, 5_2, \ldots 5_n$, a number of transistors **6*a*, . . . ,6*n* may be connected between the transistors 4 and 3 respectively in the Darlington manner to obtain an output similar to that of the embodiment of FIG. 2 when the number of transistors 6*a* . . . 6*n*** is one-half of the number of diodes $5_1 \ldots 5_n$.

Figure 4:
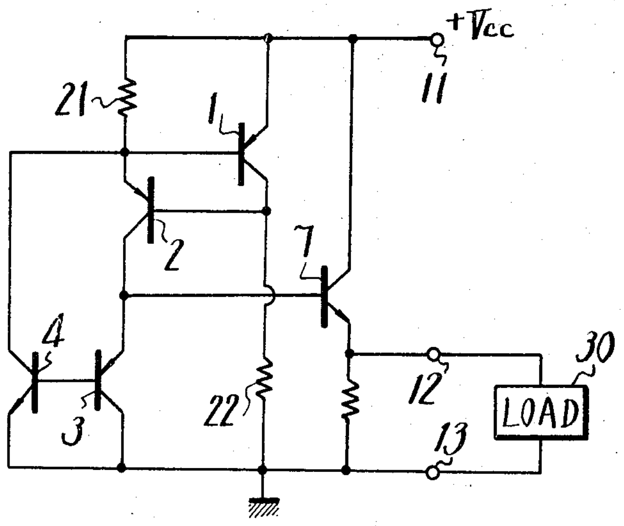

In the circuit shown in FIG. 4, an emitter follower transistor 7 is provided as a buffer circuit to obtain a large output current. In this case, the output voltage can be made low as compared with that of the circuit shown in FIG. 1 by means of the voltage between the base-emitter of the transistor 7, and such output voltage has a temperature characteristic corresponding to that of one PN junction.

Figure 5:
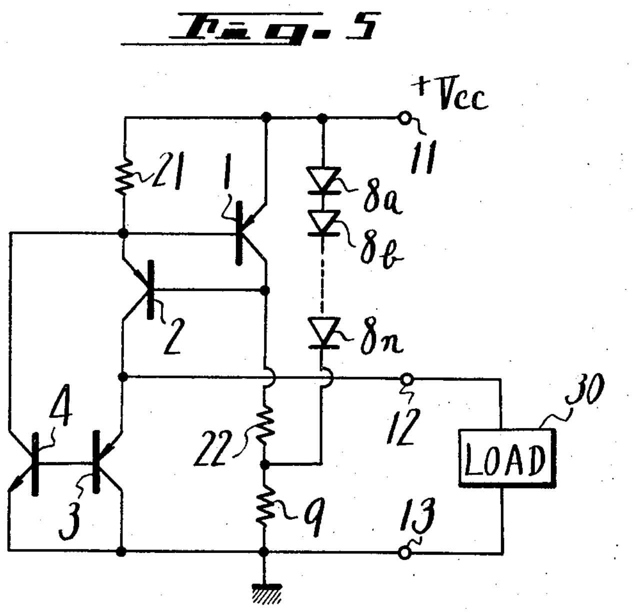

In the circuit shown in FIG. 5, diodes 8a to 8n and a resistor 9 are added to the circuit shown in FIG. 1 to stabilize the collector current of the transistor 1 with respect to the variation of the power supply voltage *Vcc*. With the circuit of Fig. 5, an output voltage which is more stable than that of FIG. 1 can be obtained.

Figure 6:
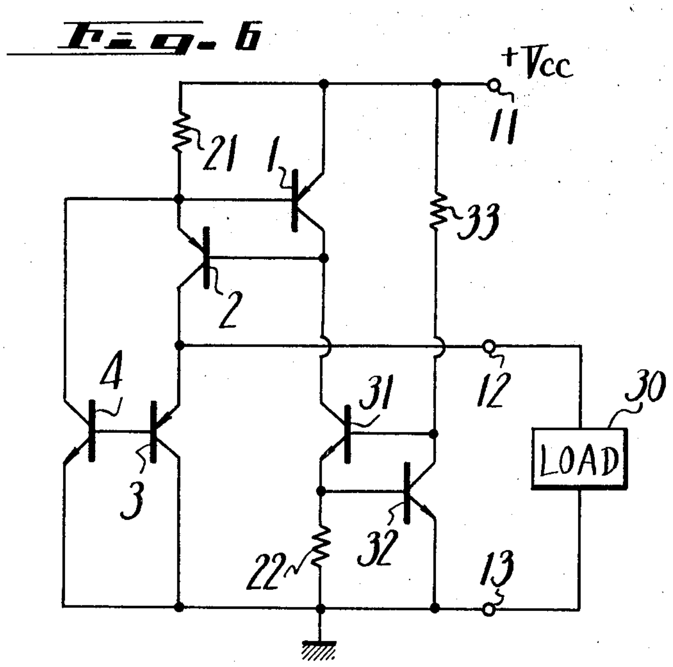

In the circuit shown in FIG. 6, a pair of transistors 31 and 32, which are connected similarly to the transistors 1 and 2, and a resistor 33 are added to the circuit shown in FIG. 1 to stabilize the collector current of the transistor 1 with respect to the variation of power supply voltage *Vcc*. With the circuit of this example, the output voltage, similarly to that in FIG. 5, is more stable than the output voltage obtained with the circuit of FIG. 1.

Although preferred embodiments of this invention have been described as above in detail, it is to be understood that various changes, substitutions and alterations can be made therein without departing from the spirit and scope of the novel concepts of the invention as defined by the appended claims.

What is claimed is:

1. A regulated voltage supply circuit comprising:

A. first, second and third transistors of one conductivity type each having base, emitter and collector electrodes;

B. a fourth transistor of the opposite conductivity type having base, emitter and collector electrodes;

C. a voltage supply source having first and second voltage terminals;

D. circuit means for connecting the emitter and collector electrodes of said first transistor to said first and second voltage terminals respectively with a first impedance between the collector electrode and said second voltage terminal;

E. circuit means for connecting the emitter electrode of said second transistor to said first voltage terminal through a second impedance and also to the base electrode of said first transistor;

F. circuit means for connecting the base electrode of said second transistor to the collector electrode of said first transistor;

G. circuit means for connecting the emitter and collector electrodes of said third transistor to the collector electrode of said second transistor and said second voltage terminal respectively;

H. circuit means for connecting the base electrodes of said third and fourth transistors to each other;

I. circuit means for connecting the collector and emitter electrodes of said fourth transistor to the emitter electrode of said second transistor and said second voltage terminal respectively; and J. an output terminal, and means connecting said output terminal to the collector electrode of said second transistor.

2. A regulated voltage supply circuit according to claim 1, wherein said first and second impedances are first and second resistors respectively.

3. A regulated voltage supply circuit according to claim 1, further comprising a number of forward biased PN junctions between the base electrodes of said third and fourth transistors and in which said number is a positive integer.

4. A regulated voltage supply circuit according to claim 1, further comprising a number of forward biased PN junctions between said output terminal and the emitter electrode of said third transistor, and in which said number is a positive integer.

5. A regulated voltage supply circuit according to claim 1, further comprising a number of forward biased PN junctions between the emitter electrode of said fourth transistor and said second voltage terminal, and in which said number is a positive integer.

6. A regulated voltage supply circuit according to claim 1, wherein said means connecting the output terminal to the collector electrode of said second transistor includes a fifth transistor having base, emitter and collector electrodes, said fifth transistor being connected in an emitter follower configuration with its base electrode connected to the collector electrode of said second transistor and said output terminal being connected with the emitter electrode of said fifth transistor.

7. A regulated voltage supply circuit according to claim 1, further comprising a third impedance interposed between said first impedance and said second voltage terminal, and a plurality of series-connected diodes connected between first voltage terminal and a junction between said first and third impedances for stabilizing the collector current of said transistor with respect to variations in the voltage at said supply source.

8. A regulated voltage supply circuit according to claim 1, further comprising fifth and sixth transistors each having base, emitter and collector electrodes, a third impedance, circuit means connecting the collector and emitter electrodes of said fifth transistor to said collector electrode of said first transistor and to said first impedance, respectively, circuit means connecting said emitter and base electrodes of said fifth transistor to said base and collector electrodes, respectively, of said sixth transistor, and circuit means connecting said collector and emitter electrodes of said sixth transistor to said first and second voltage terminals, respectively, with said third impedance interposed between said first voltage terminal and said collector electrode of the sixth transistor.

* * * * *